United States Patent
Ileogben

(10) Patent No.: US 8,416,411 B2
(45) Date of Patent: Apr. 9, 2013

(54) METHODS AND APPARATUSES FOR ADJUSTING A VARIABLE SHEAVE PULLEY

(76) Inventor: Pius Ileogben, Lawrenceville, GA (US)

(*) Notice: Subject to any disclaimer, the term of this patent is extended or adjusted under 35 U.S.C. 154(b) by 468 days.

(21) Appl. No.: 12/712,153

(22) Filed: Feb. 24, 2010

(65) Prior Publication Data

US 2011/0207565 A1    Aug. 25, 2011

(51) Int. Cl.
*G01B 11/00* (2006.01)

(52) U.S. Cl. ........ 356/399; 356/400; 356/153; 356/138; 33/286; 33/293

(58) Field of Classification Search .......... 356/399–401, 356/138, 141.3, 153; 33/228, 286, 293
See application file for complete search history.

(56) References Cited

U.S. PATENT DOCUMENTS

| | | | | |
|---|---|---|---|---|
| 4,249,294 A | * | 2/1981 | Belfiore | 29/271 |
| 5,717,666 A | * | 2/1998 | Park | 369/44.11 |
| 5,987,762 A | * | 11/1999 | Toth et al. | 33/286 |
| 6,031,616 A | * | 2/2000 | Seiffert | 356/399 |
| 6,098,297 A | * | 8/2000 | Belfiore | 33/286 |
| 6,434,841 B1 | * | 8/2002 | Stahl et al. | 33/286 |
| 6,931,738 B2 | * | 8/2005 | Bodgren et al. | 33/286 |
| 6,968,625 B2 | * | 11/2005 | Segerstrom et al. | 33/286 |
| 7,042,561 B1 | * | 5/2006 | Andersson | 356/153 |
| 7,412,773 B2 | * | 8/2008 | Hobel et al. | 33/286 |
| 8,250,770 B2 | * | 8/2012 | Diefenderfer | 33/286 |

* cited by examiner

*Primary Examiner* — Layla Lauchman
(74) *Attorney, Agent, or Firm* — Baxam Law Group, LLC; Deanna L. Baxam

(57) ABSTRACT

Pulley alignment apparatus for aligning pulleys when the operating position of a variable sheave pulley of a pulley system has changed is provided. The pulley alignment apparatus has an adjustable laser light unit that can be adjusted to compensate for the resulting displacement of the centerline of the variable sheave pulley when the operating position is changed. The pulley alignment apparatus also has a set of gauges for determining the operating position of a variable sheave pulley and determining if a belt is adequate for the variable sheave pulley at the operating position.

8 Claims, 5 Drawing Sheets

METHODS AND APPARATUSES FOR ADJUSTING A VARIABLE SHEAVE PULLEY

FIELD

The present invention relates to methods and apparatuses for aligning pulleys.

BACKGROUND

Pulleys are used for a variety of purposes. For example, a pulley may be installed on a motor to drive a fan pulley to produce air by connecting a belt between both pulleys. For a motor pulley to drive a fan pulley efficiently, the centerline of both pulleys must be aligned. Otherwise, the belt may twist and fail prematurely. A pulley may have either a fixed or variable sheave. The fixed sheave pulley has one operating position while a variable sheave pulley can be set to operate at various positions. Pulleys may become misaligned for a number of reasons including when a pulley is replaced, a belt is changed, or the operating position of a variable sheave pulley is changed.

The most common method of aligning pulleys involves holding a straight edge against the outer surface of the sheaves of both pulleys. When the straight edge is rested against the outer surface of the sheaves of the pulleys, the pulleys are said to be aligned. Obviously, this method of alignment is dependent on the interpreter. This method also does not work to align a variable sheave pulley when its operating position is changed.

Another method of aligning pulleys involves using a straight line laser light pointer and targets. With this method, the straight line laser light pointer is attached to a sheave of the motor pulley and the targets are attached to a sheave of the fan pulley. The pulleys are aligned when the laser light from the pointer falls on marks on the targets simultaneously. Although the laser method offers a more accurate method of aligning pulleys with fixed sheaves than the straight edge method, the laser method also does not accurately align a variable sheave pulley when its operating position is changed.

SUMMARY

Embodiments of the present invention include apparatuses and methods for aligning a variable sheave pulley and a second pulley after the operating position of the variable sheave pulley has changed. An exemplary apparatus comprises a light source configured to emit light, a carriage configured to adjust the position of the light source relative to the light source housing, and a position detection device for determining the position or displacement of the light source. Exemplary position detection devices may be a scale or a sensor such as a contact sensor or a proximity sensor.

An exemplary method comprises attaching a light source that emits light to the outer surface of a sheave of a variable sheave pulley, attaching at least one target to the outer surface of a sheave of a second pulley, changing a position of the light emitted from the light source relative to the housing of the light source by a predetermined function of the change in distance between the sheaves of the variable sheave pulley resulting from a change in operating position of the variable sheave pulley, and adjusting the variable sheave pulley based on the light and the at least one target.

Both the foregoing general description and the following detailed description are exemplary and explanatory only and are not restrictive of the invention as claimed.

DETAILED DESCRIPTION

Reference throughout this specification to "an embodiment" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Furthermore, the described features, structures, or characteristics may be combined in any suitable manner in one or more embodiments. In the following description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

Figure 6:
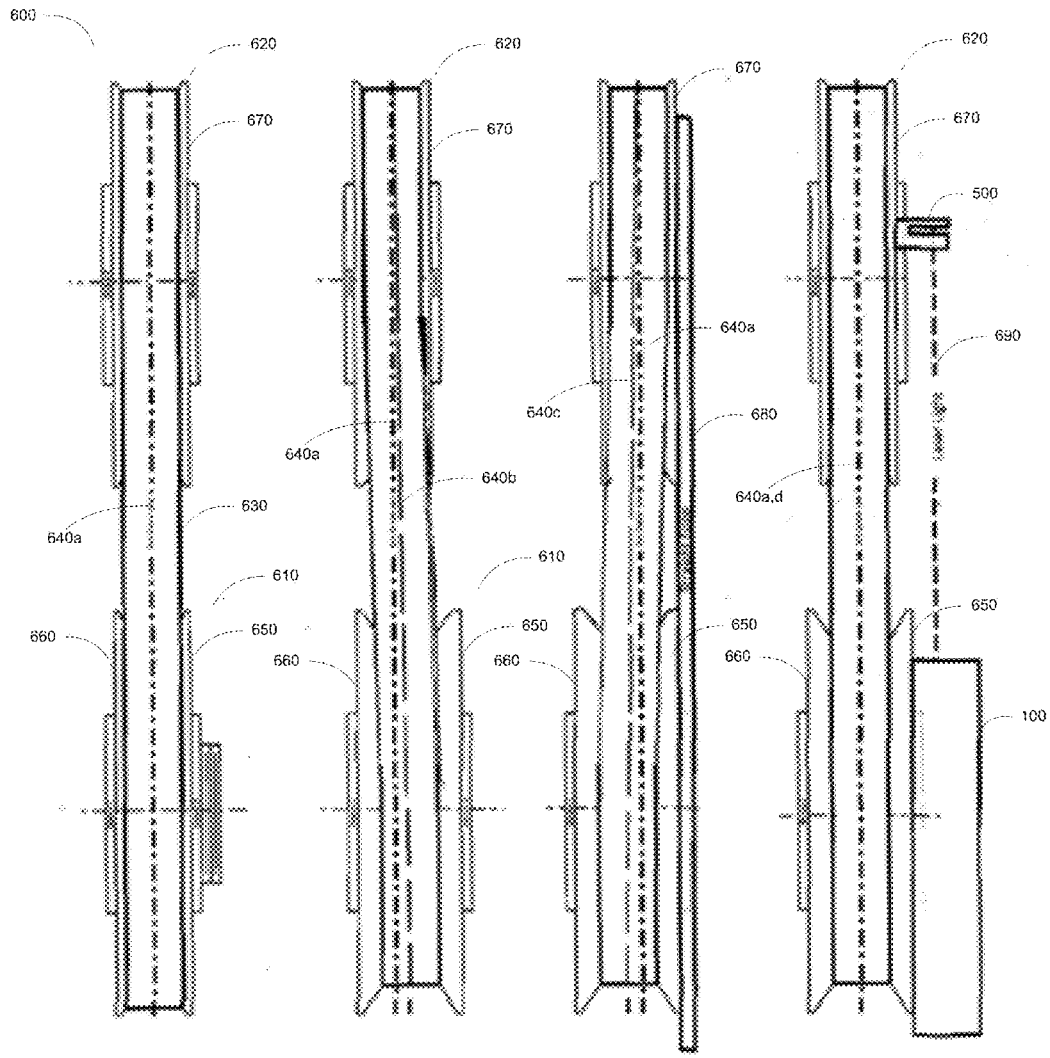
FIG. 6 illustrates various configurations of a pulley system.

FIG. 6 illustrates the problem with prior art alignment devices such as a straight edge and a straight line laser light pointer and targets and illustrates how exemplary embodiments of the present invention address these problems.

FIG. 6 illustrates a pulley system 600 comprising a variable sheave pulley 610, a second pulley 620 (e.g., a fan pulley), and a belt 630. When the pulley system 600 is initially installed, the centerline 640a of the variable sheave pulley 610 and the second pulley 620 may be aligned.

The operating position of variable sheave pulley 610 may be changed by moving sheave 650. However, when the operating position of the variable sheave pulley 610 is changed, the distance between sheaves 650 and 660 changes, thereby changing the centerline 640b of variable sheave pulley 610. As shown in FIG. 6, when the operating position of the variable sheave pulley 610 is changed, the centerline 640a of the second pulley 620 and the centerline 640b of variable sheave pulley 610 become misaligned.

In the prior art, to align the pulleys 610, 620, the outer surface of sheave 650 of variable sheave pulley 610 and the outer surface of sheave 670 of the second pulley 620 are aligned using a straight edge 680 or alternatively using a straight line laser light pointer and targets. However, when the pulleys 610, 620 are aligned using these prior art devices, centerline 640a of the second pulley 620 and centerline 640c of variable sheave pulley 610 still are misaligned because these prior art devices do not account for the change in the distance between sheaves 650 and 660 when the operating position is changed.

As shown in FIG. 6, embodiments of the present invention account for the change in the distance between sheaves 650 and 660 when the operating position is changed to accurately align centerline 640a of the second pulley 620 and the centerline 640d of variable sheave pulley 610.

Figure 1:
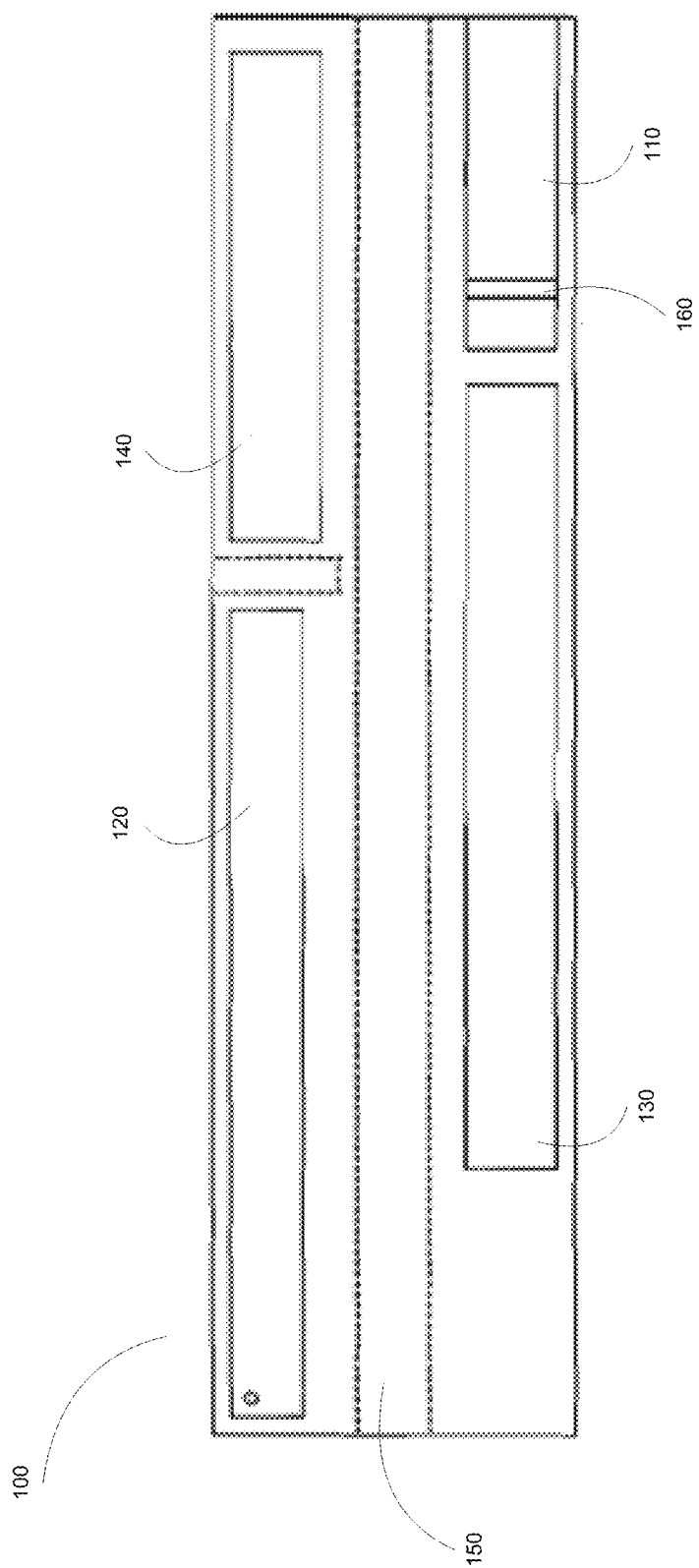
FIG. 1 illustrates a pulley alignment apparatus according to an exemplary embodiment of the present invention.

FIG. 1 illustrates a pulley alignment apparatus 100 according to an exemplary embodiment of the present invention. The pulley alignment apparatus 100 may include a laser module 110, housing for a set of gauges 120, a power source 130, housing for targets 140, and attachment means 150.

Figure 2:
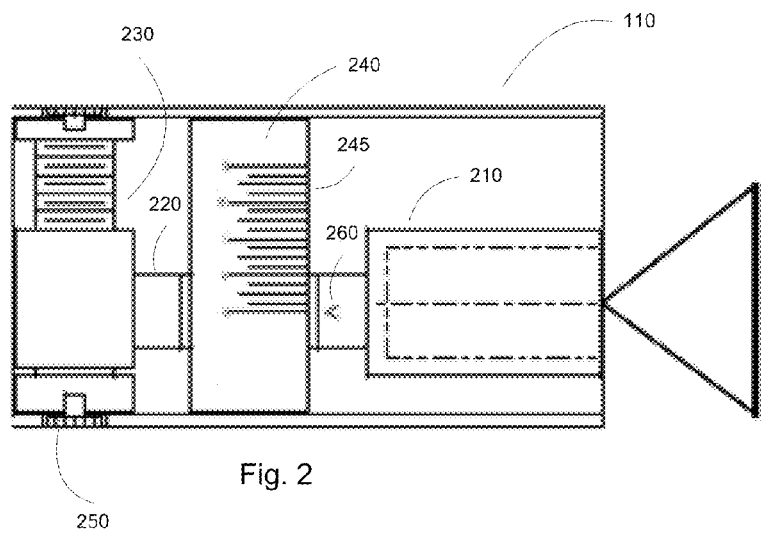
FIG. 2 illustrates an exemplary embodiment of a laser module of the pulley alignment apparatus of FIG. 1.

FIG. 2 illustrates an exemplary embodiment of laser module 110. The laser module 110 may include laser light unit 210, platform 220, carriage 230, and a column 240 having a scale 245 imprinted on it that indicates the position (or displacement) of laser light unit 210. Laser light unit 210 is mounted on platform 220 and emits light. The platform 220 is attached to carriage 230, which moves platform 220 to change the position of laser light unit 210 when a dial 250 is rotated. The platform 220 may include a marker 260 to align with an indication on scale 245. The marker 260 and scale 245 may be viewed through a window 160 of laser module 110.

Figure 3:
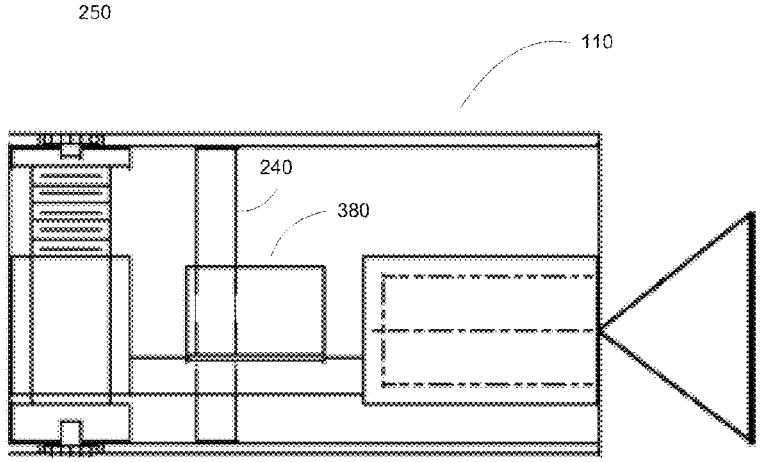
FIG. 3 illustrates an alternate embodiment of a laser module of the pulley alignment apparatus of FIG. 1.
Figure 4:
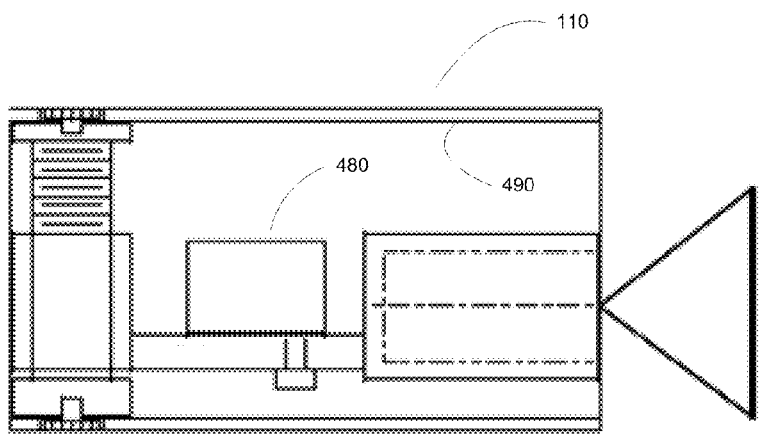
FIG. 4 illustrates an alternate embodiment of a laser module of the pulley alignment apparatus of FIG. 1.

In alternative embodiments, the laser module 110 may include an alternative position detection device such as a contact sensor 380 or proximity sensor 480, as illustrated in FIGS. 3 and 4, respectively, or any other contact or non-contact position measurement sensor, for determining the position (or displacement) of laser light unit 210.

Contact sensor 380 may determine the position or displacement of laser light unit 210 based on the distance the contact sensor 380 has moved relative to column 240, which may serve as a contact for contact sensor 380.

Proximity sensor 480 may determine the position or displacement of laser light unit 210 based on, for example, light emitted from the sensor 480 and reflected off an inner wall 490 of laser module 110. Proximity sensor 480 may use light, sound, induced magnetic fields, electromagnetic or electrostatic fields, or any other means to determine position or displacement.

In these alternative embodiments, window 160 of laser module 110 may display a digital readout of the position or displacement of laser light unit 210.

Figure 5:
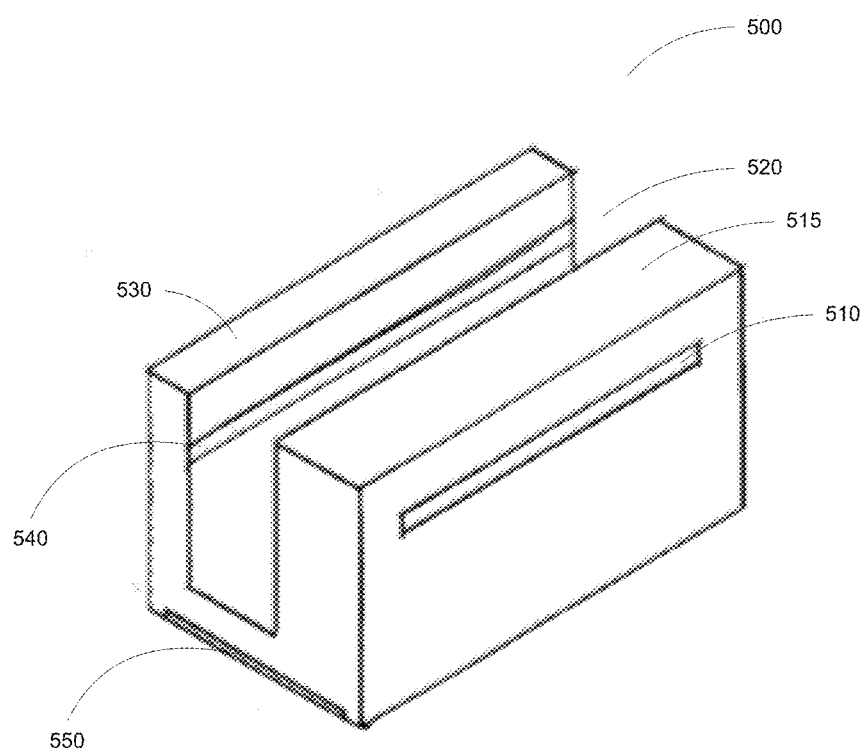
FIG. 5 illustrates an exemplary embodiment of a target of the pulley alignment apparatus of FIG. 1.

FIG. 5 illustrates an exemplary target 500 that may be stored in target housing 140. Target 500 includes a slot 510 through a first wall 515, a channel 520, and a back wall 530 having a mark 540. The slot 510 may have a height that is at least the width of the light emitted from laser module 110. Channel 520 separates the first wall 515 from the back wall 530. Mark 540 on the back wall 530 may have a height that is at least the width of the light emitted from laser module 110.

An exemplary method of aligning pulleys using the pulley alignment apparatus 100 will now be described.

Referring to FIG. 6, after the operating position of a variable sheave pulley 610 of pulley system 600 has been changed, the position of laser light unit 210 of laser module 110 must be adjusted using dial 250 to compensate for the resulting displacement of the centerline of variable sheave pulley 610 when the operating position was changed.

For every change in the operating position of the variable sheave pulley 610, the distance between the sheaves 650, 660 changes by a predetermined amount. For every change in the operating position of the variable sheave pulley 610, the laser light unit 210 must be adjusted by a predetermined function of the predetermined amount of change in the distance between the sheaves 650, 660.

For example, in an exemplary embodiment of the present invention, the centerline of the variable sheave pulley 610 changes by ½ the change in the distance between the sheaves 650, 660. Thus, if the distance between the sheaves 650, 660 changes by 0.032 inches for every change by one position in the operating position of variable sheave pulley 610, then the centerline of the variable sheave pulley 610 changes by 0.016 inches for every change by one position in the operating position of variable sheave pulley 610. The marker 260 and scale 245 of FIG. 2 may be used to accurately adjust the laser light unit 210 or alternatively, a digital readout of the position or displacement of laser light unit 210 may be used.

In an exemplary embodiment, the marks on the scale 245 may represent an operating position of variable sheave pulley 610. The distance between the marks on scale 245 may represent the change in the centerline of the variable sheave pulley 610 when the operating position of variable sheave pulley 610 changes by one position. Thus, if the operating position of variable sheave pulley 610 changes by two positions, for example, the position of laser light unit 210 must be adjusted by two marks using dial 250.

Once the position of laser light unit 210 of laser module 110 has been adjusted, to align the pulleys 610, 620 of pulley system 600 based on the new operating position of the variable sheave pulley 610, the pulley alignment apparatus 100 is attached to the outer surface of sheave 650 of variable sheave pulley 610 using attachment means 150. Attachment means 150 may be a magnetic strip or any other suitable mechanism (either integrated with pulley alignment apparatus 100 or a separate device) for securing the pulley alignment apparatus 100 to sheave 650. Target 500 is attached to the outer surface of sheave 670 of the other pulley 620. Target 500 may be attached to sheave 670 magnetically (e.g., via a magnetic strip 550) or using any other suitable mechanism (either integrated with target or a separate device) for securing the target 500 to sheave 670.

With the light 690 of the pulley alignment apparatus 100 directed toward the target 500, the variable sheave pulley 610 is adjusted until the light 690 travels through the slot 510 on target 500 and aligns with the mark 540 on the back wall 530 of target 500. The variable sheave pulley 610 may be adjusted by loosening a bolt holding the variable sheave pulley 610 to a motor shaft and removing a key installed between the variable sheave pulley 610 and the motor shaft to enable moving the variable sheave pulley 610.

Figure 7:
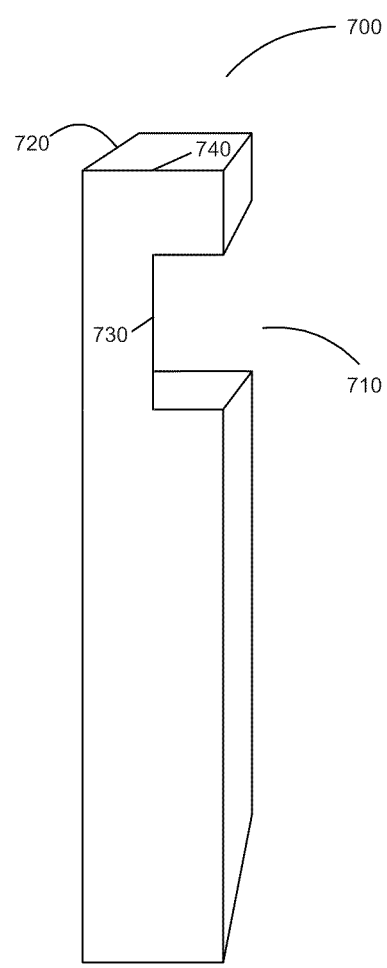
FIG. 7 illustrates an exemplary gauge of the pulley alignment apparatus of FIG. 1.

FIG. 7 illustrates an exemplary gauge 700 of the set of gauges that may be stored in housing 120 of the pulley alignment apparatus 100. The set of gauges stored in housing 120 may be used to determine if a belt 630 is adequate for the variable sheave pulley 610 at the new operating position.

The set of gauges may include gauges of a variety of sizes. For instance, each gauge may vary in thickness 720, which represents an operating position of the variable sheave pulley 610. Furthermore, each gauge may include an opening 710 having a width 730 for measuring the belt 630 to determine if the belt 630 is adequate for driving the variable sheave pulley 610 at the operating position represented by thickness 720. Each gauge may have the same width 740 that may be slightly wider than the thickness 720 of the gauge representing the maximum operating position of the variable sheave pulley 610.

Table 1 below depicts exemplary dimensions for a set of gauges that may be stored in housing 120 to determine if the belt 630 is adequate for the variable sheave pulley 610 at a particular operating position. Each row of the table represents an operating position of the variable sheave pulley 610 and the dimension of gauge 700 needed for that operating position.

TABLE 1

| Operating Position | Thickness (720) | Opening Width (730) |
|---|---|---|
| 1 | 0.032 | 0.4 |
| 2 | 0.064 | 0.4 |
| 3 | 0.096 | 0.4 |
| 4 | 0.128 | 0.4 |
| 5 | 0.16 | 0.4 |
| 6 | 0.192 | 0.4 |
| 7 | 0.224 | 0.4 |
| 8 | 0.256 | 0.4 |
| 9 | 0.288 | 0.55 |
| 10 | 0.32 | 0.55 |
| 11 | 0.352 | 0.7 |
| 12 | 0.384 | 0.7 |
| 13 | 0.416 | 0.7 |
| 14 | 0.448 | 0.7 |

The gauge of the set of gauges that represents the operating position of a variable sheave pulley 610 may be determined by inserting the gauges one-by-one between the sheaves 650, 660 of the variable sheave pulley 610 (starting in order with the smallest gauge) until the largest gauge that can fit between the sheaves 650, 660 is determined. The largest gauge that can fit between the sheaves 650, 660 represents the operating position of the variable pitch pulley 610. If any gauge fits between the sheaves 650, 660 of the variable sheave pulley width-wise, then the sheaves 650, 660 are far apart for any belt 630. Otherwise, the opening 710 for the gauge representing the operating position of the variable sheave pulley 610 may be used to measure the belt 630 to determine if the belt 630 is adequate for the variable sheave pulley 610 at the operating position. If the width 730 of the opening 710 is larger than the width of the belt 630, then the belt 630 is not adequate for the variable sheave pulley 610 at the operating position represented by the gauge.

Many modifications and other embodiments of the invention will come to mind to one skilled in the art to which this invention pertains having the benefit of the teachings presented in the forgoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. An apparatus for aligning a variable sheave pulley and a second pulley after the operating position of the variable sheave pulley has changed comprising:
   a light source configured to emit light;
   a carriage configured to adjust the position of the light source relative to a light source housing; and
   a position detection device for determining the position or displacement of the light source.

2. The apparatus of claim 1, wherein the position detection device is a scale.

3. The apparatus of claim 2, wherein the scale represents a predetermined function of the change in distance between the sheaves of a variable sheave pulley resulting from a change in operating position of the variable sheave pulley.

4. The apparatus of claim 1, wherein the position detection device is a sensor.

5. The apparatus of claim 4, wherein the sensor is a contact sensor.

6. The apparatus of claim 4, wherein the sensor is a proximity sensor.

7. A method for aligning a variable sheave pulley and a second pulley after the operating position of the variable sheave pulley has changed comprising:
   attaching a light source that emits light to the outer surface of a sheave of a variable sheave pulley;
   attaching at least one target to the outer surface of a sheave of a second pulley;
   changing a position of the light emitted from the light source relative to the housing of the light source by a predetermined function of the change in distance between the sheaves of the variable sheave pulley resulting from a change in operating position of the variable sheave pulley; and
   adjusting the variable sheave pulley based on the light at the new position and the at least one target.

8. The method of claim 7, wherein the position of the light emitted from the light source relative to the housing of the light source is changed by ½ the change in distance between the sheaves of the variable sheave pulley resulting from a change in operating position of the variable sheave pulley.

* * * * *